C. M. WILLIAMSON.
SENSITIZING MEDIUM CHANGING MECHANISM.
APPLICATION FILED JULY 1, 1918.
1,293,595. Patented Feb. 4, 1919.
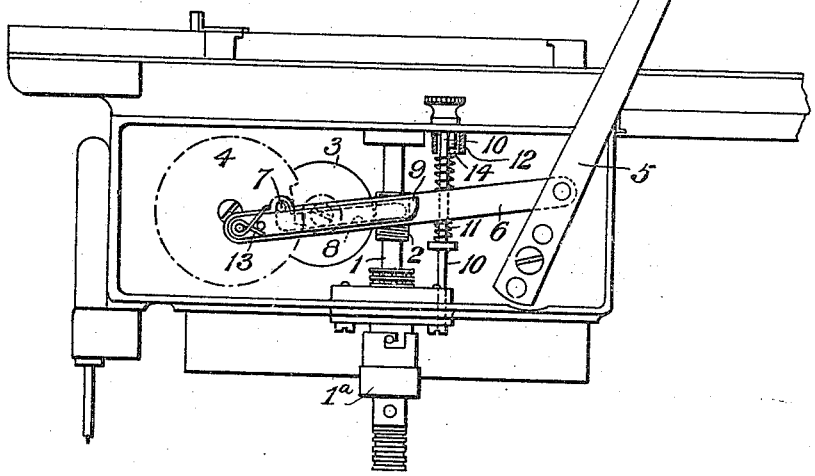
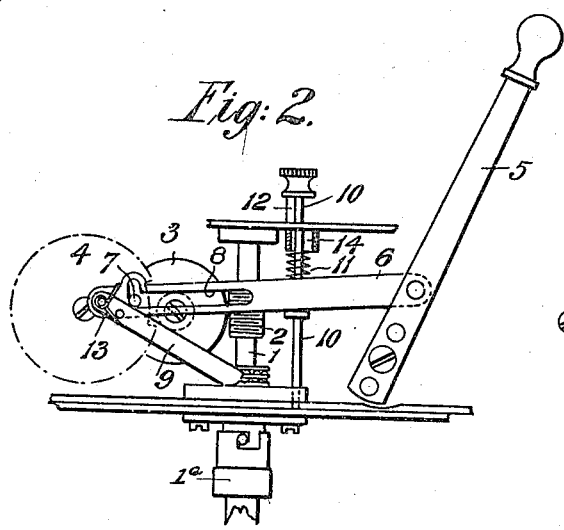
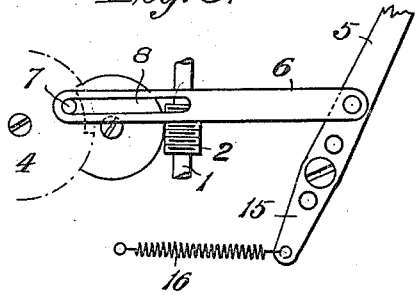
Inventor
Colin Martin Williamson
per Arthur J. Stephens
Attorney

UNITED STATES PATENT OFFICE.

COLIN M. WILLIAMSON, OF LONDON, ENGLAND.

SENSITIZING-MEDIUM-CHANGING MECHANISM.

1,293,595.  Specification of Letters Patent.  Patented Feb. 4, 1919.

Application filed July 1, 1918. Serial No. 242,942.

*To all whom it may concern:*

Be it known that I, COLIN MARTIN WILLIAMSON, a subject of the King of Great Britain and Ireland, residing at 28 Denmark street, London, England, have invented new and useful Improvements in Sensitizing-Medium-Changing Mechanism, of which the following is a specification.

My invention relates to improvements in those photographic cameras described in Patent Application Serial No. 208,971, filed the 26th December, 1917, in which interchangeable locking means is provided to allow of the camera being operated either manually or by means of an airscrew.

In this camera a train of gearing operating the mechanism for changing the plates or other sensitized medium, is adapted to be connected with a train of gearing driven from an airscrew or to be disconnected from the airscrew train of gearing and manually operated by a handle. A locking pin is provided which can be used to lock the handle to the connecting link between the trains or gearing or to release the handle and to lock a member of the train of gearing driven from the airscrew to the camera casing.

Experience has proved that there is some danger of losing the locking pin and the present invention is designed to provide mechanism in which there are no loose parts which can be removed and mislaid or lost.

My invention is illustrated by way of example in the accompanying drawings, in which—

Figure 1 shows a side view of the mechanism in the position in which the operating handle is linked to the train of gearing driven from the airscrew;

Fig. 2 shows the position of the link mechanism in which the handle is disconnected, and Fig. 3 shows an alternative form.

Referring now to the drawings:—1 indicates the shaft driven from an airscrew through the medium of a flexible shaft connected coupling member 1ª, 2 the worm mounted on said shaft and 3 the worm wheel driven from said worm adapted to rotate through a train of gearing the mutilated wheel 4 mounted upon and rotating a shaft carrying an escapement wheel controlling the movement of a pallet and consequently the movement of the shutter-operating trigger in the manner broadly set forth in the aforesaid application. This mutilated wheel 4 is connected by means of the link 6, with the handle 5 through which the train of gearing operating the plate changing mechanism is actuated as disclosed in said companion application. The wheel 4 is provided with a crank pin 7 engaging in a slot 8 formed in the link 6. The pin 7 is normally retained in a lateral extension of said slot 8 by means of a spring-controlled member suitably in the form of a pivoted plate 9 thereby linking the handle to the mutilated wheel 4 and providing for the plate changing mechanism being driven through said link from the airscrew.

When it is desired to disconnect the handle 5 from the mutilated wheel 4 the link 6 is raised by means of the lifting member 10 to a position in which the slot 8 in the link 6 is clear of the spring-controlled member 9 and the pin 7 is free to move in said slot 8 as shown in Fig. 2. In this position the airscrew is therefore disconnected and the camera can be operated through the handle 5 at the will of the operator. In order that the parts may be automatically returned to the normal position shown in Fig. 1, the lifting member 10 is controlled by a spiral spring 11 tending to return said member to the position shown in Fig. 1 when a stop 12 projecting from said member registers with a slot 14 in the camera casing. The slot covering member 9 is controlled by a spring 13 tending to bring said cover over the slot 8 when the mechanism is in the position shown in Fig. 1.

In an alternative form illustrated in Fig. 3, the pin 7, can be held normally at the end of the slot 8 by a spring 16 acting on the extended lever end 15 of the handle 5 so that the gearing will operate the link 6. Upon disconnecting the spring 16 or otherwise freeing the handle 5 from the retractile action of the spring, the pin 7 will move freely in the slot 8 without transmitting power to the link 6.

I have described in detail the particular construction illustrated in the accompanying drawings, but it will be evident to engineers that various modifications and changes may be made within the concept of my invention.

What I claim is:—

1. A photographic camera for aircraft comprising a train of gearing, means for driving said train of gearing, a second train of gearing operating the plate changing mechanism, a handle adapted to drive said second train of gearing, a slotted link adapted to connect said trains of gearing, a connecting member moved by said first train of gearing adapted to slide in the slot in said link and means for holding said connecting member in a position in said link slot in which said trains of gearing are connected.

2. A photographic camera for aircraft, comprising a train of gearing, means for driving said train of gearing, a second train of gearing operating the plate changing mechanism, a handle adapted to drive said second train of gearing, a crank pin mounted on a wheel in said first train of gearing, a slotted link adapted to connect said crank pin with the operating handle of said second train of gearing and means for holding said crank pin in a position in said link slot in which said trains of gearing are connected.

3. A photographic camera for aircraft comprising a train of gearing, an airscrew adapted to drive said train of gearing, a second train of gearing operating the plate changing mechanism, a handle adapted to drive said second train of gearing, a crank pin mounted on a wheel in said first train of gearing, a slotted link adapted to connect said crank pin with the operating handle of said second train of gearing, a plate pivoted to said link, a spring mounted on said link tending to hold said pivoted plate over the link slot and said crank pin in a lateral extension of the slot.

4. A photographic camera for aircraft comprising a train of gearing, an airscrew adapted to drive said train of gearing, a second train of gearing operating the plate changing mechanism, a handle adapted to drive said second train of gearing, a crank pin mounted on a wheel in said first train of gearing, a slotted link adapted to connect said crank pin with the operating handle of said second train of gearing, a plate pivoted to said link, a spring mounted on said link tending to hold said pivoted plate over the link slot and said crank pin in a lateral extension of the slot and means for lifting said link to a position in relation to the crank pin that the cover plate is moved away from the link slot and said pin is free to move in the slot.

5. A photographic camera for aircraft comprising a train of gearing, an airscrew adapted to drive said train of gearing, a second train of gearing operating the plate changing mechanism, a handle adapted to drive said second train of gearing, a crank pin mounted on a wheel in said first train of gearing, a slotted link adapted to connect said crank pin with the operating handle of said second train of gearing, a plate pivoted to said link, a spring mounted on said link tending to hold said pivoted plate over the link slot and said crank pin in a lateral extension of the slot, a lifting member adapted to raise said link to a position in which the link slot is clear of the spring controlled pivoted plate and said crank pin is in a position free to move in said slot, and a spring controlling said lifting member.

6. A photographic camera for aircraft comprising a train of gearing, an airscrew adapted to drive said train of gearing, a second train of gearing operating the plate changing mechanism, a handle adapted to drive said second train of gearing, a crank pin mounted on a wheel in said first train of gearing, a slotted link adapted to connect said crank pin with the operating handle of said train of gearing, a plate pivoted to said link, a spring mounted on said link tending to hold said pivoted plate over the link slot and said crank pin in a lateral extension of the slot, a spindle mounted in the camera casing, an arm on said spindle adapted to project beneath said link, means at the free end of said spindle for raising said link through said spindle to a position in which the link slot is clear of the pivoted plate and said crank pin is in a position free to move in said slot and a spiral spring tending to hold said spindle in a position in which the crank pin is in position in the slot extension.

7. A photographic camera for aircraft comprising a train of gearing, an airscrew adapted to drive said train of gearing, a second train of gearing operating the plate changing mechanism, a handle adapted to drive said second train of gearing, a crank pin mounted on a wheel in said first train of gearing, a slotted link adapted to connect said crank pin with the operating handle of said second train of gearing, a plate pivoted to said link, a spring mounted on said link tending to hold said pivoted plate over the link slot and said crank pin in a lateral extension of the slot, a lifting member adapted to raise said link to a position in which the link slot is clear of the spring controlled pivoted plate and the crank pin is free to move in said slot, a spring controlling said lifting member and a stop on said lifting member adapted to co-act with a slot in the camera casing.

8. A photographic camera for aircraft, comprising a train of gearing, means for connecting said gearing with an air-screw, an operating member connected to an element of the sensitized-medium changing mechanism, a link connection between said member and said gearing, and means for rendering said link connection operative or inoperative at will.

9. A photographic camera for aircraft comprising a train of gearing, means for driving said train of gearing, a handle for operating the sensitized-medium changing mechanism, a slotted link adapted to connect said handle to said gearing, a connecting member actuated by said gearing and adapted to slide in the slot in said link, and means for holding said member in position to connect said handle operatively to said gearing.

In testimony whereof I sign my name to this specification.

C. M. WILLIAMSON.

Copies of this patent may be obtained for five cents each, by addressing the "Commissioner of Patents, Washington, D. C."